J. T. WHALEN.
CONTROLLING MECHANISM FOR VEHICLES.
APPLICATION FILED MAY 24, 1907.
971,334.
Patented Sept. 27, 1910.
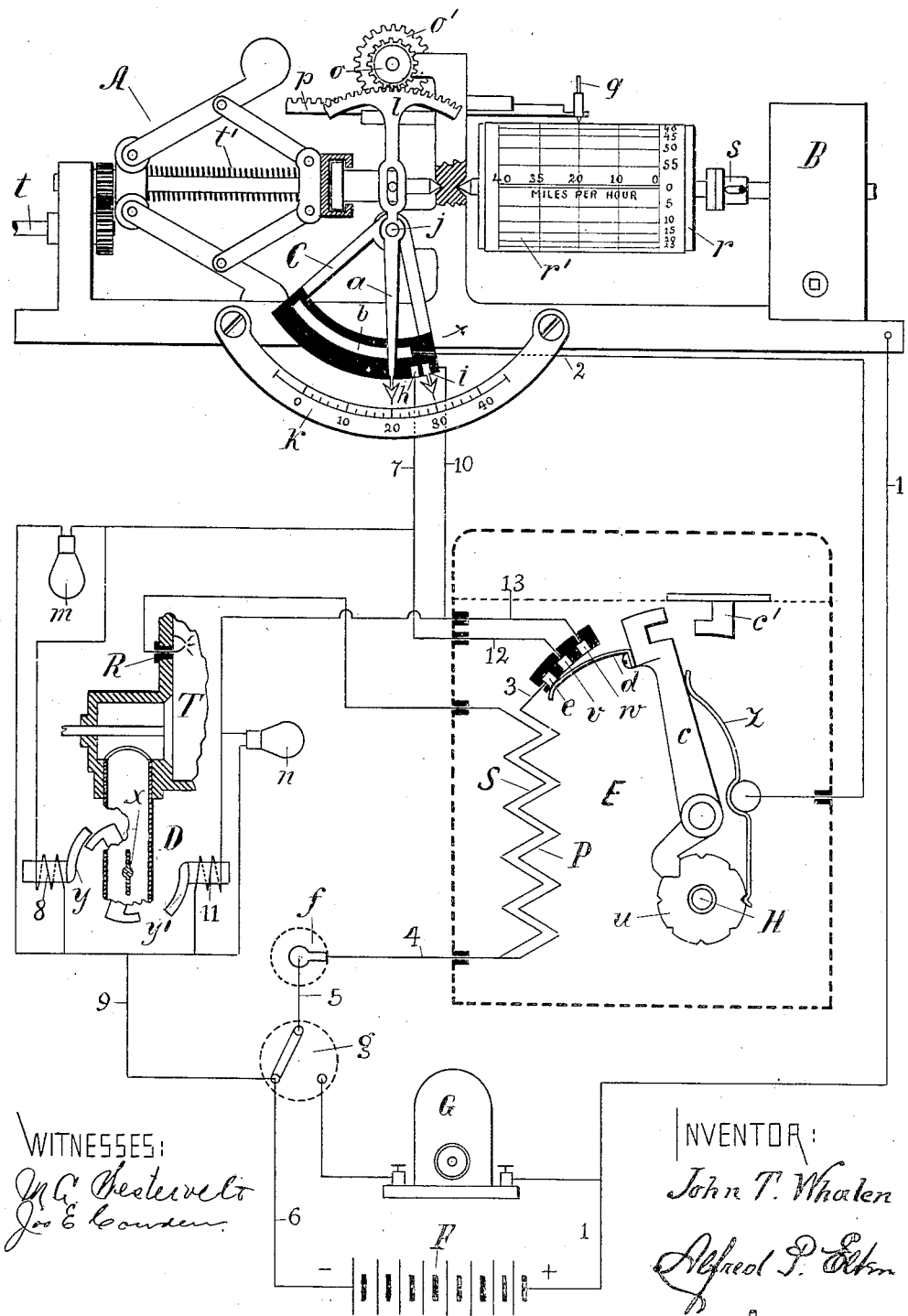
WITNESSES:
INVENTOR:
John T. Whalen
Alfred P. Elton
ATTORNEY.

UNITED STATES PATENT OFFICE.

JOHN T. WHALEN, OF BROOKLYN, NEW YORK.

CONTROLLING MECHANISM FOR VEHICLES.

971,334.  Specification of Letters Patent.  Patented Sept. 27, 1910.

Application filed May 24, 1907. Serial No. 375,521.

*To all whom it may concern:*

Be it known that I, JOHN T. WHALEN, a citizen of the United States of America, and a resident of the borough of Brooklyn, county of Kings, State of New York, have invented certain new and useful Improvements in Controlling Mechanism for Vehicles, of which the following is a specification.

This invention relates to controlling apparatus and is intended primarily for employment with motor-vehicles, although also useful for other purposes.

In brief my invention comprises a source, or sources, of electricity, a number of electric circuits and several groups of interacting mechanical parts connected by these electric circuits, some of which parts are also actuated and controlled by power from other additional sources, not electrical, to perform, by their concerted action, functions as follows: 1. To indicate to the operator by a pointer the varying rate of speed of travel of the vehicle. 2. To record the distance traveled in miles and fractions of a mile, per hour. 3. To vary, at will, the limit of the rate of speed of travel of the vehicle. 4. To reduce the fuel supply to the engine when approaching the limit predeterminedly set to the speed of travel. 5. To illumine an electric lamp when approaching the limit set to the speed of travel of the vehicle. 6. To interrupt the fuel supply to the engine when reaching the set speed limit. 7. To illumine a different electric lamp when reaching the set speed limit. 8. To interrupt the flow of the energizing current from the said source of electricity to the induction coil, by means of a permutation-lock-switch, to cause the apparatus to become inoperative. 9. To interrupt the fuel supply to the engine at any time by means of a permutation-lock-switch. 10. To lock the induction-coil-box, by means of the said permutation-lock-switch when standing still, to prevent operation of the vehicle by unauthorized persons and those not knowing the "combination" of the said permutation lock.

The drawing accompanying this specification and forming part of the same shows, diagrammatically, the different sources of power I propose to employ to obtain the end sought, the groups of mechanical parts or translating devices serving as intermediaries, and the electric circuits by which these parts are operatively connected, one with the other, and with the source of electricity.

In applying my invention to a self-propelling vehicle, of whatever description, for the purposes and uses before alluded to, one of the parts of my apparatus, a centrifugal governor, as A, is adapted to be actuated by, and to receive motion from, one of the wheels of the vehicle or any other part of the vehicle moving synchronously with the wheels, through a flexible shaft, gearing or other suitable devices not shown, thereby setting into motion certain contact levers, marking pencils, or kindred means whereby not only a switch may be operated and a visual indication on a suitable scale provided for that purpose obtained, permitting the operator at any moment to observe at a glance at what speed he is traveling, but also a continuous record of the progress and the variations of speed may be marked on a strip of paper or similar material which is caused to pass before a marking pencil or stylus at a uniform rate of travel by an independent motor, for example, a clock-mechanism or time train, as B. The pointer, as $a$, which, turned by the centrifugal governor A, furnishes in combination with a scale a visual indication of the rate of speed, preferably in miles per hour, is also adapted to act as a contact-maker on a commutator, as C, to switch into action certain electric circuits for the purpose of throttling the fuel supply to the engine at D whenever a pre-determined speed limit is approached and reached, as well as to interrupt the circuit of the primary or energizing winding of the induction coil or spark producer, as E, which receives its current from a battery F or a magneto-electric generator G. A permutation-lock switch H secured to the induction-coil box E serves the combined purposes of a lock for closing the coil box when not in actual use and of a switch, as will be explained more fully hereinafter. From the positive terminal of battery F a wire, as 1, leads to the metallic frame of the centrifugal governor A, the electric current flowing through said frame, pointer $a$, contact-piece $b$ on commutator C and wire 2 to the metallic casing of lock-switch H, from there through swinging lock-bar $c$, contact-spring $d$ contact-piece $e$ and wire 3 to the primary winding P of the induction coil and through wire 4, timing-switch $f$, wire 5, cutting-out switch $g$ and wire 6 to the negative terminal of the battery F.

The commutator C is shown to consist of a segmental frame supporting an insulating block having three contact pieces, as $b$ $h$ and $i$, which frame is pivotally supported at $j$ and may be placed and held at any desired angle. From contact-piece $i$ projects an index finger pointing toward a scale, as $k$, which is arranged concentrically and graduated to indicate the rate of speed of travel in miles per hour. The adjustment of the different parts of the centrifugal governor A and of the graduated scale $k$ is such that when contact piece $i$ is opposite the numeral 30 on said scale, as shown on diagram, the pointer $a$ will have been turned so as to rest on contact piece $i$, due to the action of centrifugal force on the swinging balls of the governor, as is well understood, whenever the speed of the vehicle reaches a rate of 30 miles per hour. However, immediately before coming to rest on contact piece $i$ pointer $a$ will have rested on contact piece $h$, therethrough sending part of the current coming from wire 1, and passing through pointer $a$, into wire 7 to electric lamp $m$ as well as through coil 8 of the fuel throttling device D, and through wire 9 to the negative terminal of battery F. This derived circuit serves to prevent an increase of the speed of the vehicle by reducing the fuel supply to the engine. Should, however, the speed of the vehicle continue to increase until reaching the rate of 30 miles an hour, the pointer $a$ will then by sliding off contact piece $b$ break the circuit leading through wire 2 and lock switch H to the primary winding of the induction coil, thereby interrupting the production of ignition sparks, and in addition, current will be sent through contact piece $i$ and wire 10 to lamp $m$ and coil 11 of the fuel throttling device D to completely interrupt the fuel supply to the engine, these conditions remaining until the speed of the vehicle is reduced below the predetermined and set limit. When the commutator C is swung to a position farther in the direction of the arrow and held there, the vehicle, if capable of doing so, may increase its speed and keep on increasing until the centrifugal governor has turned pointer $a$ so as to rest on contact pieces $h$ and $i$ successively when an action as before described will take place, tending to reduce the speed. On the other hand, the commutator may be set so as to prevent the vehicle from moving any faster than at the rate of but a few miles per hour. The pointer $a$, in conjunction with the scale $k$, thus enables the operator to see at a glance the rate of speed of the vehicle, the variations of the speed as they occur, and how close the actual speed is to the predetermined and set limit of same, while the occupants of the vehicle or the persons who set the limit of the speed by adjusting commutator C may be assured that the car cannot possibly exceed the set limit of the speed as long as it is moved by the energy of the engine only.

To furnish a continuous and permanent record of the progress of the vehicle and speed variations, the contacting pointer $a$ is shown to extend upward and provided at its upper end with a segmental part having teeth, as at $l$, which teeth mesh with the teeth of gear $o$, while the teeth of intermediary gear $o'$ mounted on the same shaft as gear $o$ mesh with the teeth of rack bar $p$, which latter carries the marking pencil or stylus $q$. It is obvious that any variation in the speed of the vehicle and therefore, also, of the motion of the centrifugal governor, will manifest themselves by a corresponding reciprocating motion of rack bar $p$, which motion is utilized to cause a record to be marked on a strip of paper caused to move before the said rack bar in a direction at right angles to the motion of the rack bar, by a pencil fastened to the latter and bearing on the paper. A clock mechanism or other motor, imparts a uniform motion to a drum, or drums, around which the paper is led. B indicates the clock-mechanism and $r$ the paper drum, while $r'$ shows the strip of paper. A clutch, as $s$, is provided between the shafts of the time train and the shaft of the paper drum, to enable the latter to become disengaged from the former. Motion is shown to be transmitted to the centrifugal governor from a moving part of the vehicle at $t$ by any of the well-known means, while a spring $t'$ serves to oppose the action of centrifugal force on the swinging balls of the governor.

During the operation of the vehicle, the parts of the permutation switch lock are in their relative positions as shown in the drawing, that is, the coil box is unlocked and the current may pass through the primary winding P of the induction coil, thereby generating a current of sufficiently high tension in the secondary coil S to produce sparks at the gap of the spark plug R within the combustion chamber T of the engine, as is well understood. Spring $z$ tends to return lock bar $c$ to its position of rest with one end while engaging the kerfs of the permutation disks with the other. Part $c'$ is secured to the cover of the box.

The purpose of my permutation lock switch is two-fold: First, when the vehicle is not to be used,—by turning the kerfed permutation disks $u$ of the lock, from without the box, the swinging lock bar $c$, in locking the coil box by engaging with $c'$, breaks the circuit of the primary winding P, thereby making it impossible for any sparks to be obtained from the induction coil and preventing the use of the vehicle by unauthorized persons. Second, when the vehicle is in operation,—by turning the said permutation disks $u$, not only is the production of igniting sparks made impossible, but the fuel supply to the engine may be instantly interrupted, regardless of the actual speed, or the set speed limit, by reason of the current from the battery, instead of passing from contact spring $d$ through contact piece $e$ into the induction coil, passes first through contact piece $v$ and wire 12 and then through contact piece $w$ and wire 13, to the coils 8 and 11 of the fuel throttling device, respectively, thereby interrupting the fuel supply to the engine.

From the above is seen that the switch formed by commutator C and pointer $a$, on the centrifugal governor A, and actuated by the same, performs functions identical to those performed by the switch on the coil box which is actuated by hand through the medium of a permutation lock. When the coil box is locked, it is essential to have a knowledge of the "combination" of the switch lock to start the engine and the vehicle.

The fuel throttling device is shown to consist of a damper $x$, arranged in the pipe connecting the carbureter with the inlet valve chamber of the engine, which damper is mounted on a spindle together with the armatures of two magnets, in such a manner that these two armatures, $y$ and $y'$ may be attracted successively by the pole pieces of electromagnets 8 and 11, respectively, to first close the fuel supply pipe only partly, and after that shutting off the fuel-supply altogether. The damper may be moved by each of the two magnets through an arc of about 45 degrees, or of 90 degrees by the two magnets, one after the other, from the position "wide open" to the one at right angles when the damper closes the fuel supply pipe completely. A spring, not shown, returns the armatures to their position of rest together with the damper, as shown, that is, when no current passes through electromagnets 8 and 11.

I do not wish to confine myself to the particular means and constructions indicating in the accompanying diagram the devices I propose to use in carrying out my invention, as I may prefer to employ devices and details of a different nature or design, though for the same purpose and result, and which devices will be described in separate applications for Letters Patent.

Having now described my invention, what I claim as new and desire to secure by Letters Patent is:

1. In a speed controlling apparatus, the combination of a switch, a source of electricity connected to said switch, a contact lever moving over said switch, means for moving the contact lever over said switch comprising a shaft receiving motion from a moving vehicle, which motion varies with the varying rate of speed of travel of said vehicle, means for throttling the fuel supply of an engine actuated by said source of electricity, and an electric igniter connected to said switch.

2. In a speed controlling apparatus, the combination of an electrically operated fuel-throttling device, an electric igniter, a source of electricity, a switch connected to said fuel throttling device and igniter, a second switch connected to said switch, source of electricity and fuel throttling device, and a lock actuating said second switch.

3. In a speed-controlling apparatus, the combination of an electrically-operated fuel-throttling device, a source of electricity, a switch located within an induction coil box connecting said fuel-throttling device to said source of electricity, and a lock actuating said switch and arranged to lock the said induction coil box whenever the energizing circuit of the induction coil is broken by the said switch.

4. In a speed controlling apparatus a source of electricity, an electric motor for actuating a fuel-throttling device, an electric igniter, and a switch operated by a centrifugal governor connected to said igniter and fuel-throttling device, and adapted to simultaneously operate said fuel-throttling device and igniter, and to render said igniter inoperative.

5. In a speed controlling apparatus, a source of electricity, an electric igniter, an electrically operated fuel-throttling device, a switch connected to said source, igniter and fuel-throttling device, and a switch lever, adapted to successively operate said igniter and fuel-throttling device simultaneously, and said fuel-throttling device alone.

6. In a speed controlling apparatus, a source of electricity, an electric igniter, an electrically operated fuel-throttling device, a signal lamp, and a switch adapted to successively operate said electric igniter alone, said electric igniter and fuel-throttling device simultaneously, and said fuel-throttling device and signal lamp simultaneously.

Signed at Brooklyn this 22 day of May 1907.

JOHN T. WHALEN.

Witnesses:
 Thomas Remian,
 Levi Blumenau.